June 5, 1962     J. F. PAULSEN     3,037,764
COMPRESSION SPRINGS MADE OF RUBBER OR AN ELASTOMER
Filed June 6, 1960     3 Sheets-Sheet 1
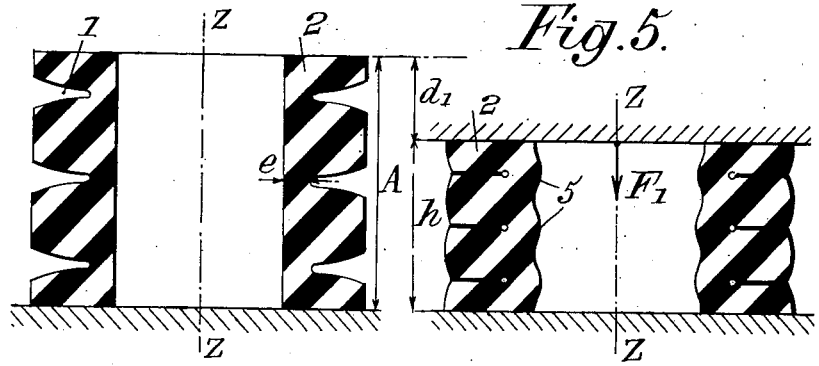
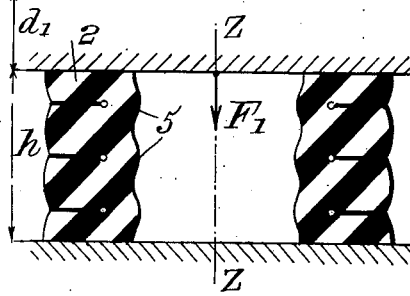
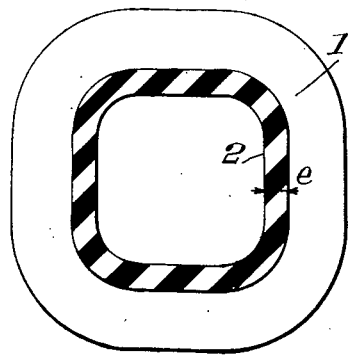
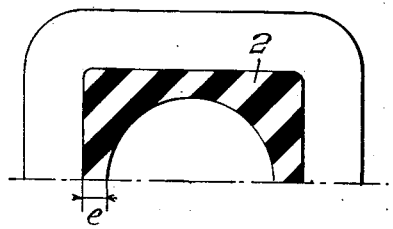
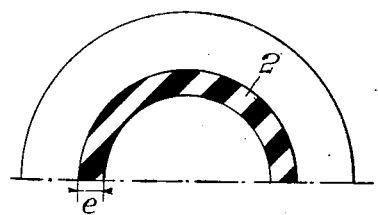
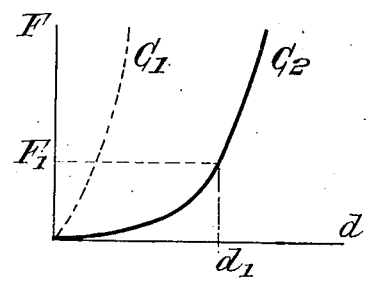

June 5, 1962 J. F. PAULSEN 3,037,764
COMPRESSION SPRINGS MADE OF RUBBER OR AN ELASTOMER
Filed June 6, 1960 3 Sheets-Sheet 2
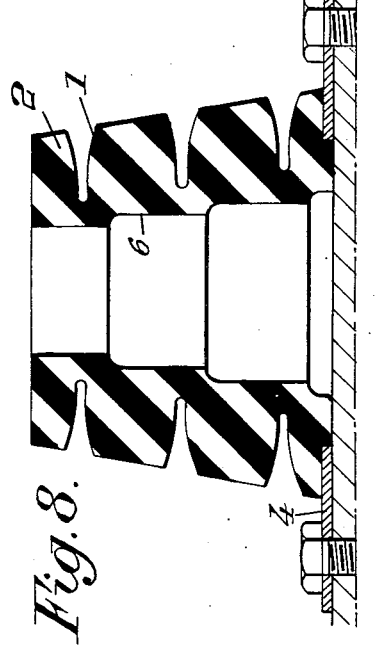
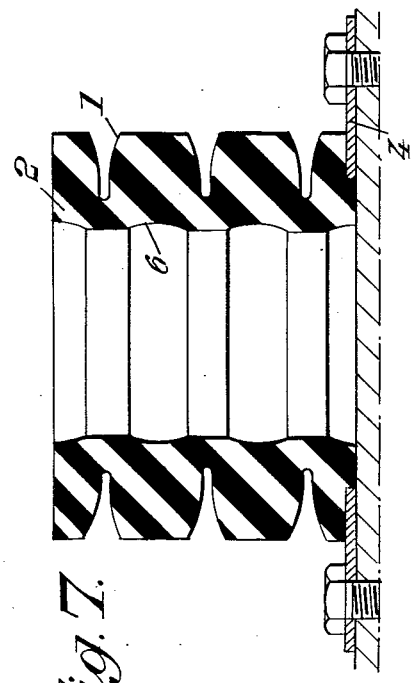
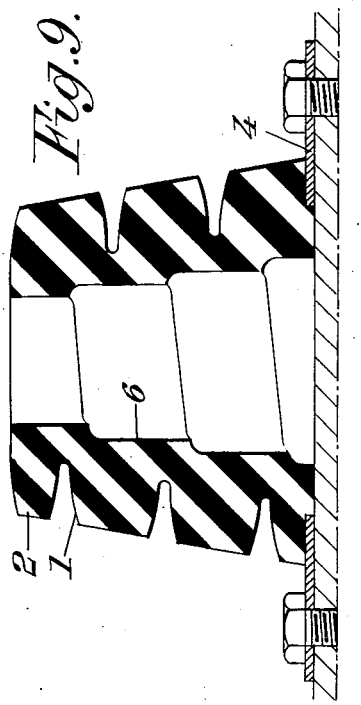

United States Patent Office 3,037,764
Patented June 5, 1962

3,037,764
COMPRESSION SPRINGS MADE OF RUBBER
OR AN ELASTOMER
Jean Felix Paulsen, Paris, France, assignor to Societe Luxembourgeoise de Brevets et de Participations, a society of Luxemburg
Filed June 6, 1960, Ser. No. 34,021
Claims priority, application France June 10, 1959
1 Claim. (Cl. 267—63)

The present invention relates to compression springs made of rubber or an elastomer and essentially constituted by a tubular mass of general cylindrical prismatic or frusto-conical shape.

The chief object of this invention is to provide a spring of this type which has improved flexibility characteristics.

According to an essential feature of this invention, such a spring has at least one side wall thereof provided with grooves arranged to close more and more as the load on the spring increases, so as to be wholly closed for a given load.

Preferred embodiments of the present invention will be hereinafter described with reference to the accompanying drawings, given merely by way of example and in which:

FIGS. 1 and 2 are an axial sectional view and a cross sectional view respectively of a compression rubber spring made according to the invention.

FIGS. 3 and 4 are cross sections analogous to that of FIG. 2 and corresponding to two modifications respectively.

FIG. 5 is a section similar to that of FIG. 1 showing the spring when compressed under the effect of a high load.

FIG. 6 is a diagram illustrating the operation of the springs made according to this invention.

FIGS. 7 to 9 are axial sectional views of springs made according to three other embodiments of the invention.

Figure 10:
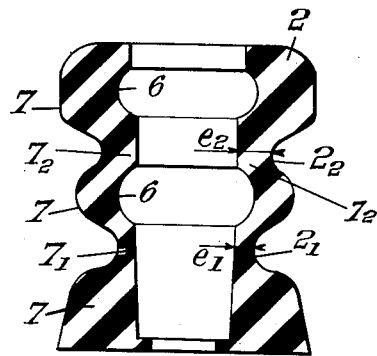
FIGS. 10, 11 and 12 show, in axial section, and respectively in the state of rest and in two different loaded positions, a spring made according to still another embodiment of the invention.

The springs according to the present invention, made of rubber or another elastomer, may be used in particular for vehicle suspensions.

It is known that such rubber springs, generally constituted by a tubular mass, that is to say an elongated mass having a central hole, have a curve of deformation such as that shown at $C_1$ on FIG. 6 (this figure showing the deformations $d$ in abscissas and the loads F in ordinates), the rigidity increasing rather quickly from the origin.

Now it is of interest in many cases to obtain a low rigidity, i.e. a high flexibility, at the origin and for a range of deflection such as $d_1$ with, above this value, a quickly increasing rigidity. Such an operation is for instance illustrated by the curve $C_2$ of FIG. 6.

For this purpose, according to the present invention, the spring is provided, in at least one of its side walls and in particular in its outer side wall, with grooves arranged in such manner as to tend to be closed under the action of the load, these grooves therefore serving, for the lowest load, to increase the flexibility until, when they have been closed and under the action of still greater loads, they give the whole the character of a block having thick walls and therefore of relatively high rigidity.

These grooves, which for instance have a V-shaped section as shown at 1 in the block 2 shown by the figures of the drawing, are advantageously disposed in planes parallel to the base of the springs. However, helical grooves may also be used, as shown by FIG. 9.

Such grooves reduce the thickness of the block at the level of their bottoms, the cross sections of the block at the level of said bottoms being such for instance as shown by FIGS. 2, 3 and 4.

When loads are applied to such springs in the axial direction ZZ, the spring yields under the effect of an increase of the load, with a high flexibility as long as the opposite faces of the grooves have not come into contact with one another. On the contrary, when the load reaches a sufficient value $F_1$ (FIG. 5) these faces have come wholly into contact with one another and from this time on the spring behaves as a block having a thick wall, of the conventional kind, that is to say having a great rigidity to compression.

It will be noted that, as shown by FIG. 5, when the load is further increased after the grooves have been closed, the subsequent deformations of the walls are characterized by external bulges in the intervals between the grooves and projections 5 of the inner wall toward the axis at the level of said grooves.

Advantageously, in order to facilitate this kind of deformation of the inner wall of the block, recesses 6 may be provided in said inner wall in the intervals between the levels of the successive grooves, as shown by FIG. 7.

These recesses preferably have in cross section (i.e. in section by axial planes of the spring) the shape of a circular arc relatively flat so as to create, in the core which serves to the molding of the block, limited projections which do not oppose the unmolding of said core, even if, as shown by FIGS. 7 to 9, the spring is itself glued at least one of its ends to a metallic plate 4 serving to its fixation by means for instance of bolts or the like.

The above mentioned recesses may be obtained, according to a modification illustrated by FIG. 8, by giving the inner wall of the block a stepped shape as shown by FIG. 8.

If the external groove is of helical shape, as shown by FIG. 9, the steps may also be of helical shape.

Of course, the grooves such as shown might be replaced by other recesses adapted to be closed under the effect of an increasing load.

In order to improve the flexibility curve, the rubber springs according to this invention may have, at the levels of the respective grooves, different thicknesses so that the effect of a gradually increasing load is to produce a gradual crushing of the spring, in particular by the successive closing of the respective grooves and the formation of folds at their levels.

Figure 11:
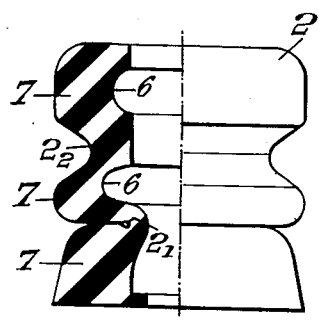
Figure 12:
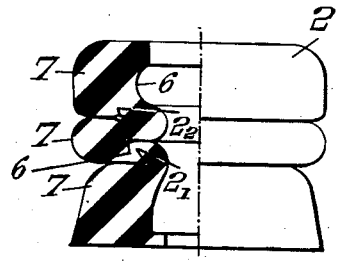

Thus, as shown by FIGS. 10 to 12, a compression spring of tubular shape is provided in its outer wall with two grooves $2_1$—$2_2$ arranged in such manner that the wall of the spring at their respective levels has different thicknesses $e_1$—$e_2$. Advantageously, grooves such as 6 are provided in the inner wall, opposite at least some of the projections 7 of the external wall. Furthermore, in order to facilitate removal of the core having served to the molding, the inner wall will be of general frusto-conical shape.

A spring according to the present invention behaves, under the action of a load, in the manner of a bellows, the annular elements of which (which limits grooves or the like) come successively to be applied against one another as the load is being increased, as shown by FIGS. 10 to 12.

FIG. 11 shows that the two annular elements 7 located on opposite sides of groove $2_1$ first come into contact with each other. The initial flexibility that is obtained is relatively great because the wall portion $7_1$ at the level of the above mentioned groove is relatively thin.

When the load increases (FIG. 12), the same effect is produced at the level of the wall portion $7_2$ corresponding to groove $2_2$.

The flexibility is much lower in this condition. Then, when the load further increases, the whole works as a solid block and the flexibility is small.

The flexibility curve is particularly advantageous. Instead of grooves proper, use might be made of recesses, such as closed holes acting in the same manner as above described. Such recesses are intended to be covered by the general term "grooves."

A spring according to the present invention has a flexibility varying in a more gradual manner as above explained and however its cost is relatively low because it is easy to manufacture.

In a general manner, while I have, in the above description, disclosed what I deem to be practical and efficient embodiments of the invention, it should be well understood that I do not wish to be limited thereto as there might be changes made in the arrangement, disposition and form of the parts without departing from the principle of the present invention as comprehended within the scope of the accompanying claims.

In these claims, the term "tubular mass" is used to designate a mass of substance of elongated shape limited by two surfaces the respective cross sections of which (i.e. their sections by planes at right angles to the longitudinal direction of said elongated mass) are two closed lines, either curvilinear or polygonal, surrounding each other. In other words, these surfaces may be of general cylindrical, prismatic or frusto-conical shape and surround each other.

What I claim is:

A compression spring consisting of a tubular mass of a substance of the group consisting of rubber and elastomers, the outer face of the side wall of said mass being provided with transverse grooves arranged to close more and more as the load on the spring increases, so as to be wholly closed for a given load, the thickness of said wall having different values at the respective levels of said grooves so as to produce a gradual flattening of said spring under the action of an increasing load by formation of folds bearing successively upon one another.

References Cited in the file of this patent
UNITED STATES PATENTS

| | | |
|---|---|---|
| 98,540 | Alden | Jan. 4, 1870 |

FOREIGN PATENTS

| | | |
|---|---|---|
| 807,953 | Great Britain | Jan. 28, 1959 |
| 1,157,837 | France | Jan. 6, 1958 |